United States Patent [19]

Naffziger et al.

[11] Patent Number: 5,421,366
[45] Date of Patent: Jun. 6, 1995

[54] SOLENOID OPERATED AIR CONTROL AND CHECK VALVE

[75] Inventors: Lee A. Naffziger, Sterling; Thomas D. Herrington, Dixon, both of Ill.

[73] Assignee: Borg-Warner Automotive, Inc., Sterling Heights, Mich.

[21] Appl. No.: 254,165

[22] Filed: Jun. 6, 1994

[51] Int. Cl.6 .............................................. F01N 3/00
[52] U.S. Cl. ........................... 137/614.2; 137/614.19; 137/907; 251/82; 251/129.22; 60/290
[58] Field of Search ........... 137/613, 854, 907, 614.19, 137/614.2; 60/290; 251/82, 129.22

[56] References Cited

U.S. PATENT DOCUMENTS

| | | |
|---|---|---|
| 1,385,058 | 7/1921 | Warter . |
| 3,275,291 | 9/1966 | Meijers et al. . |
| 3,785,152 | 1/1974 | Pozniak et al. . |
| 3,897,042 | 7/1973 | Kachergis . |
| 3,940,928 | 3/1976 | Pozniak et al. . |
| 3,942,321 | 3/1976 | Eckhardt et al. . |
| 3,948,045 | 4/1976 | Budinski et al. . |
| 3,950,943 | 4/1976 | Paddock et al. . |
| 3,964,259 | 6/1976 | Fitzgerald . |
| 3,964,510 | 6/1976 | Roller . |
| 3,964,515 | 6/1976 | May . |
| 3,974,861 | 8/1976 | Goto et al. . |
| 3,992,878 | 11/1976 | Moorman . |
| 4,000,615 | 1/1976 | Bockelmann et al. . |
| 4,026,106 | 5/1977 | Tamazawa et al. ............ 60/290 |
| 4,083,183 | 4/1978 | Yoecashi et al. .............. 60/290 |
| 4,147,030 | 4/1979 | Katahira et al. ............... 60/290 |
| 4,149,377 | 4/1979 | Taleagi et al. ................. 60/290 |
| 4,193,212 | 1/1980 | Takagi ........................... 60/290 |
| 4,232,517 | 11/1980 | Sumiyoshi et al. ............ 60/290 |
| 4,425,620 | 1/1984 | Batcheller et al. . |
| 4,477,051 | 10/1984 | Yehuda . |
| 4,507,736 | 3/1985 | Klatt . |
| 4,550,749 | 11/1985 | Krikorian . |
| 4,634,093 | 1/1987 | Schintgen . |
| 4,875,499 | 10/1989 | Fox. . |
| 4,887,792 | 12/1989 | Kuo . |
| 5,203,872 | 4/1993 | Naffzigr . |

FOREIGN PATENT DOCUMENTS

| | | |
|---|---|---|
| 883937 | 4/1970 | Canada . |
| 3032403A1 | 8/1980 | Germany . |

Primary Examiner—A. Michael Chambers
Attorney, Agent, or Firm—Willian Brinks Hofer et al.; Greg Dziegielewski

[57] ABSTRACT

A composite check valve and positively closing electromagnetic solenoid valve, particularly such a valve for regulating the introduction of secondary air into the exhaust stream of an internal combustion engine at selected times during the operation of the engine. The valve comprises an inlet port, an outlet port, a first valve element movable between open and closed positions for nominally regulating the flow of a fluid between the inlet and outlet ports, and an electromagnetic solenoid having a closure element for overriding the first element. The rigid disk or closure element can function by seating against the same seat as the first element, or by "latching" the first element in its closed position. The disclosed embodiment is a flap valve which is modified by superimposing a rigid, movable valve disk over the flap. The rigid disk is connected to the solenoid armature and is movable between an override (closed) position and a disengaged (open) position when the solenoid is energized. The rigid disk may also limit the opening of the flap to regulate the rate of fluid flow through the valve.

15 Claims, 5 Drawing Sheets

SOLENOID OPERATED AIR CONTROL AND CHECK VALVE

The present application relates to the subject matter of U.S. Pat. No. 5,203,872, which is incorporated by reference.

BACKGROUND OF THE INVENTION

The present invention relates generally to a composite check valve and positively closing electromagnetic solenoid valve, and more particularly to such a valve for regulating the introduction of secondary air into the exhaust stream of an internal combustion engine at selected times during the operation of the engine.

An internal combustion engine, particularly an automobile engine, typically is equipped with a catalytic converter to oxidize unburned hydrocarbons in the exhaust and carry out other reactions which improve the composition of the exhaust before it is discharged into the atmosphere. The catalytic converter works best if the concentration of hydrocarbons and other materials in the exhaust is not too great and adequate oxygen is provided.

When the engine is started, particularly when it is started cold, the fuel delivered to the engine is rich, and combustion is less efficient than when the engine is warm. These conditions result in a relatively high concentration of hydrocarbons in the exhaust delivered to the catalytic converter. At the same time, the oxygen in the exhaust gas is even more deficient than normal. As a result, the catalytic converter does not efficiently oxidize the hydrocarbons in the exhaust when the engine is cold. The fact that the catalytic converter itself has not reached its operating temperature aggravates this problem.

When the engine warms up, the fuel delivered to the engine is leaner and is burned more efficiently, the exhaust contains more oxygen, and the catalytic converter is at its operating temperature. As a result, the catalytic converter can function more efficiently.

The hydrocarbon-rich, oxygen-deficient exhaust of a cold engine can be catalyzed more efficiently if the exhaust gas is temporarily mixed with an oxidizing gas, typically ambient air. A secondary air supply system provides this air. In the known secondary air supply system, the outlet of an ambient air pump is connected to the exhaust via a supply valve and a check valve connected in series.

The pump operates and the supply valve and check valve pass air into the exhaust during a short interval after the engine is started, such as about two minutes. The interval is conveniently timed by an on-board computer which responds to the operation of the ignition switch. At the end of the predetermined interval, the pump is shut off. At about the same time, the supply valve is closed to isolate the pump from the exhaust system until secondary air is needed again.

The check valve prevents the reverse flow of exhaust into the supply valve and air pump while the supply valve is open. Exhaust system blockage, backfiring, or other unusual conditions could cause such reverse flow, in the absence of the check valve.

FIG. 1 shows an engine equipped with an air injection system according to the prior art. The system generally indicated at 10 comprises an intake manifold 12, feeding an engine 14, which has an exhaust manifold and an exhaust pipe at 16. The pipe 16 feeds exhaust to an air injection joint 18. A run 20 of the exhaust pipe connects the joint 18 to a catalytic converter 22.

The system for injecting secondary air at the joint 18 to supplement the exhaust stream comprises an air pump 24 having an outlet line 26 connected to the inlet port 28 of a supply valve 30. The valve 30 has an outlet port 32 connected to the inlet port 34 of a flap valve 36, which in turn has an outlet port 38 feeding the air injection joint 18 with air. The supply valve 30 and flap valve 36 are separate parts having independent housings in the prior art. The air pump 24 is turned on and off by the computer 40 via the signal line 41.

The supply valve 30 is a conventional poppet valve having a disk 42 engaging a seat 44 and a stem 46 with an opposite or downstream end 48. The stem 46 is slidable along its axis to seat or unseat the disk 42 on the seat 44. The end 48 is positioned and moved by the diaphragm actuator 50 to open or close the valve 30.

The diaphragm actuator 50 comprises an upper chamber 52 defined by the upper housing 54 and a lower chamber 56 defined by the lower housing 58. The upper and lower chambers 52 and 56 are separated by a diaphragm 60. The diaphragm 60 includes a rigid plate 62 which is fixed to the end 48. The spring 64 bears between and is located by the plate 62 and the upper housing 54. The lower chamber 56 is always vented to ambient air. The upper chamber 52 has a control port 65 receiving a vacuum line 66 which passes, via the solenoid valve 68, to the intake manifold 12—a conventional source of vacuum. The valve 68 is operated by the solenoid 70, which in turn is controlled by the computer 40.

The flap valve 36 has an apertured web 72 defining a seat and an annular, flexible flap 74 attached at its center by the button 76 to the web 72. When the flap 74 is closed, as illustrated in FIG. 1, it covers the apertures such as 78 of the seat 72. When the flap 74 opens, responsive to a greater pressure in the inlet port 34 than in the outlet port 38, it deforms so its outer edge 80 moves axially away from the web 72, uncovering the apertures such as 78 and thus permitting flow. The flap 74 is protected against buffeting and excessive deformation by a flap retaining cone 82, also secured by the center button 76 to the web 72. The flap is lightly loaded by a spring 83 bearing between the cone 82 and the flap 74 to nominally close the flap 74 and control its deformation during opening. The valve opens or closes automatically, and permits air from the pump 24 to flow into the joint 18 while preventing reverse flow of the exhaust.

The conventional air injection system of FIG. 1 works as follows. When the engine 14 is started, the computer 40 starts the air pump 24 and signals the solenoid 70 to open the valve 68. The open valve 68 permits the intake manifold 12 to draw a partial vacuum in the upper chamber 52, raising the plate 62 of the diaphragm 60 against the bias of the spring 64, thus raising the stem 46 and disk 42 of the supply valve 30 away from the seat 44 and opening the valve 30. Air from the pump 24 thus traverses the supply valve 30, forces the flap 74 away from its seat 72, and passes via the apertures 78 into the outlet port 38 and into the air injection joint 18 where it mixes with the exhaust proceeding from the engine 14 via the exhaust pipe 16. The combined air and exhaust then proceed via the run 20 into and through the catalytic converter 22.

At the end of a predetermined interval of time following operation of the ignition switch, when the engine 14 is warm and operating on a lean fuel mixture, the computer 40 signals the solenoid 70 to 5 shift the valve 68 to isolate the intake manifold 12 from the line 66 and vent the line 66 to ambient pressure. This equalizes the pressure in the upper and lower chambers 52 and 56, allowing the spring 64 to force the plate 62, stem 46, and disk 42 toward the seat 44, thus closing the valve 30. The computer 40 also directs the air pump 24 to shut down at about the same time. The poppet valve 30 is oriented so it closes contrary to the direction of flow of the pump 24 in this embodiment so exhaust gas is doubly prevented from entering the line 26 by the valves 30 and 36.

One problem with this prior art arrangement is that it requires a supply valve 30 and an independent check valve 36 to regulate the injection of secondary air and prevent the backflow of exhaust gas. Two valves cost more and are larger than a single valve. Another possible disadvantage is that the surface of the resilient flap 74 opposite the side facing the web 72 is directly exposed to hot, dirty, chemically active exhaust gases after the engine is warm and secondary air injection ceases. The flap 74 must thus be made of material which can function for an extended time in such an environment.

Failure of the flap 74 and the resulting exposure of the supply valve 30 and air pump 24 to corrosive exhaust gases, and perhaps even a consequent failure of the supply valve 30 and the pump 24, might not be readily apparent or of concern to the operator of the engine. This failure would only be detected by measuring the effluent of the catalytic converter 22 or by disassembling or inspecting the valve 30 and pump 24, so it is important that the flap 74 be a very long-lasting part in its harsh environment.

The valves shown in FIGS. 2–6 have also been used in the prior art and are discussed below.

SUMMARY OF THE INVENTION

The present invention is directed to the valves shown in FIGS. 7 and 8 which provide advantages over the prior art valves that are shown in FIGS. 1–6. One advantage of the composite valves shown in FIGS. 7 and 8 over the prior art valves shown in FIGS. 1–6 is that the present invention reduces the number of parts required to regulate the introduction of secondary air into the exhaust stream. Another advantage is that the response time of the composite valve of the present invention is much faster than the response time of the prior art valves.

The present invention includes an electromagnetic solenoid as an integral part of the structure of the valve. The structure of the valve comprises an inlet port, an outlet port, a first valve element movable between open and closed positions for nominally regulating the flow of a fluid between the inlet and outlet ports, and an electromagnetic solenoid with an overriding closure valve element for positively closing the valve and in one embodiment "latching" of the valve element, i.e., preventing the nominal shifting of the valve element.

FIGS. 7 and 8 disclose embodiments of the valve that have a flap valve which is modified by superimposing a rigid, axially movable valve disk over the flap. The rigid disk is connected to the solenoid armature and is movable between an override position (closed) to a disengaged position (open) when the solenoid is energized. In its override position, the disk may engage the seat directly, urge the flap against its seat, or do both. The disk can be configured to physically protect the exposed surface of the disk while engaging it or the seat.

The electromagnetic solenoid may be placed entirely within the flow passage. The solenoid armature is generally cylindrical and is located within the bobbin that encases the electrical winding. The closure member is attached to the stem that extends through the center of the pole piece and is attached to the center of the armature.

In case of undesired backflow into the solenoid, the bobbin has a curved top to act as a fluid chamber. Additionally, the armature is slotted and there is a small hole in the closure member to prevent a vacuum from forming in the solenoid.

The flap and seat function as a check valve permitting one-way flow of fluid when the override is disengaged. Engagement of the override prevents the flow of fluid in either direction past the flap. A portion of the flap captured between the disk and seat may act as a gasket to positively seal the valve in one embodiment.

DETAILED DESCRIPTION OF THE INVENTION

Figure 1:
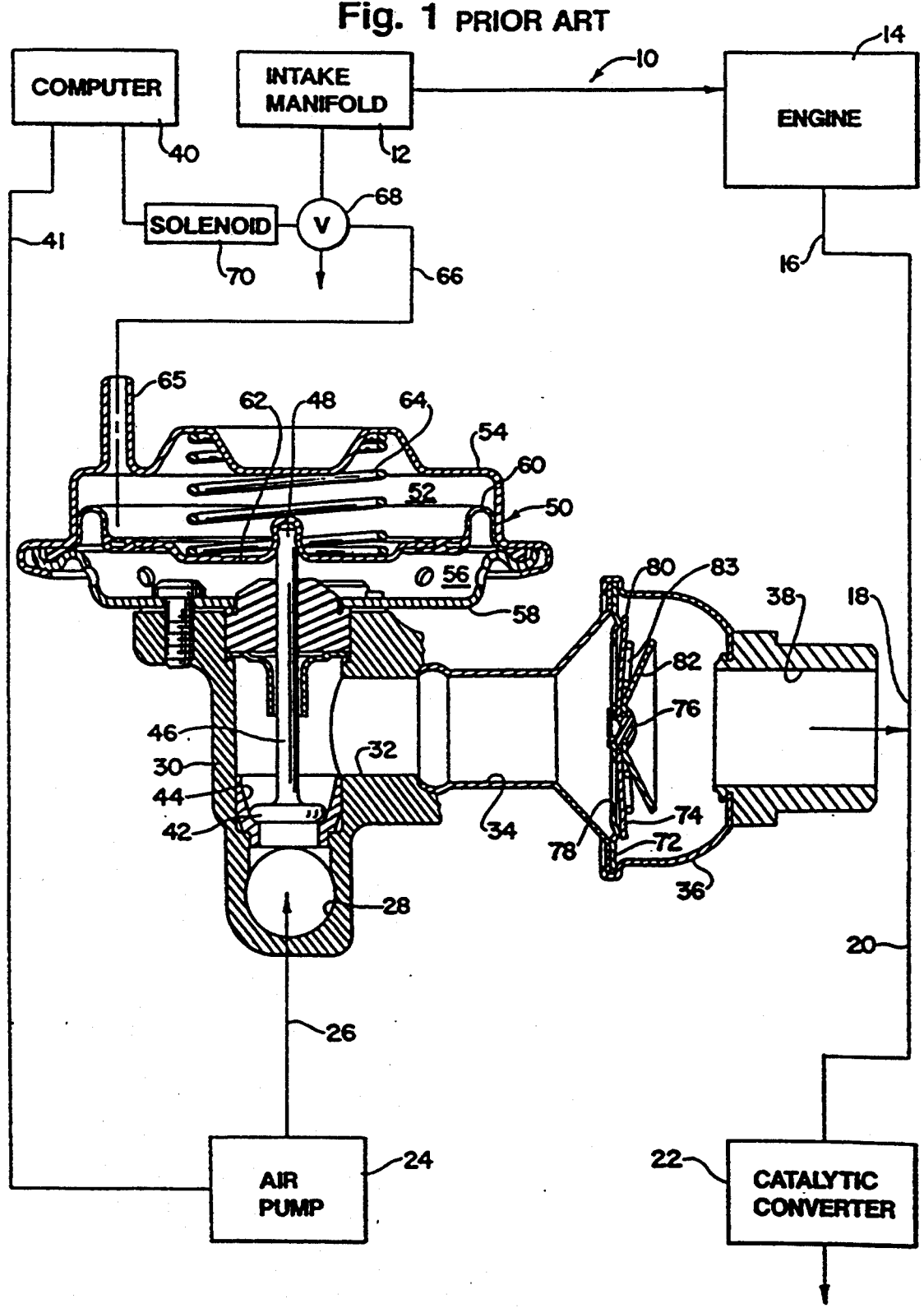
FIG. 1 is a schematic view of an exhaust system including a secondary air injection system according to the prior art, including sectional views of a conventional supply valve and check valve.

While the invention will be described in connection with certain preferred embodiments, it will be understood that the invention is not limited to those embodiments. On the contrary, the invention includes all alternatives, modifications, and equivalents as may be included within the spirit and scope of the appended claims. Like or corresponding elements in the respective views are indicated by corresponding reference characters.

The valves used in the prior art are shown in FIG. 1–6 and disclosed in U.S. Pat. No. 5,203,872. The valve of FIG. 1 is described above. The composite valve 84 of FIG. 2 directly replaces the supply valve 30, the flap valve 36, and the diaphragm actuator 50 shown in FIG. 1. In other respects the system 10 is not changed materially by this substitution. Thus, the valve 84 has an inlet port 28 adapted to receive the effluent of a pump 24, an outlet port 38 adapted to deliver air to an air injection joint 18, and a control port 65 adapted to be connected to the vacuum line 66 of a system like that of FIG. 1. The system description provided above will not be repeated here, and applies equally to the composite valve 84 shown in FIG. 2.

Figure 2:
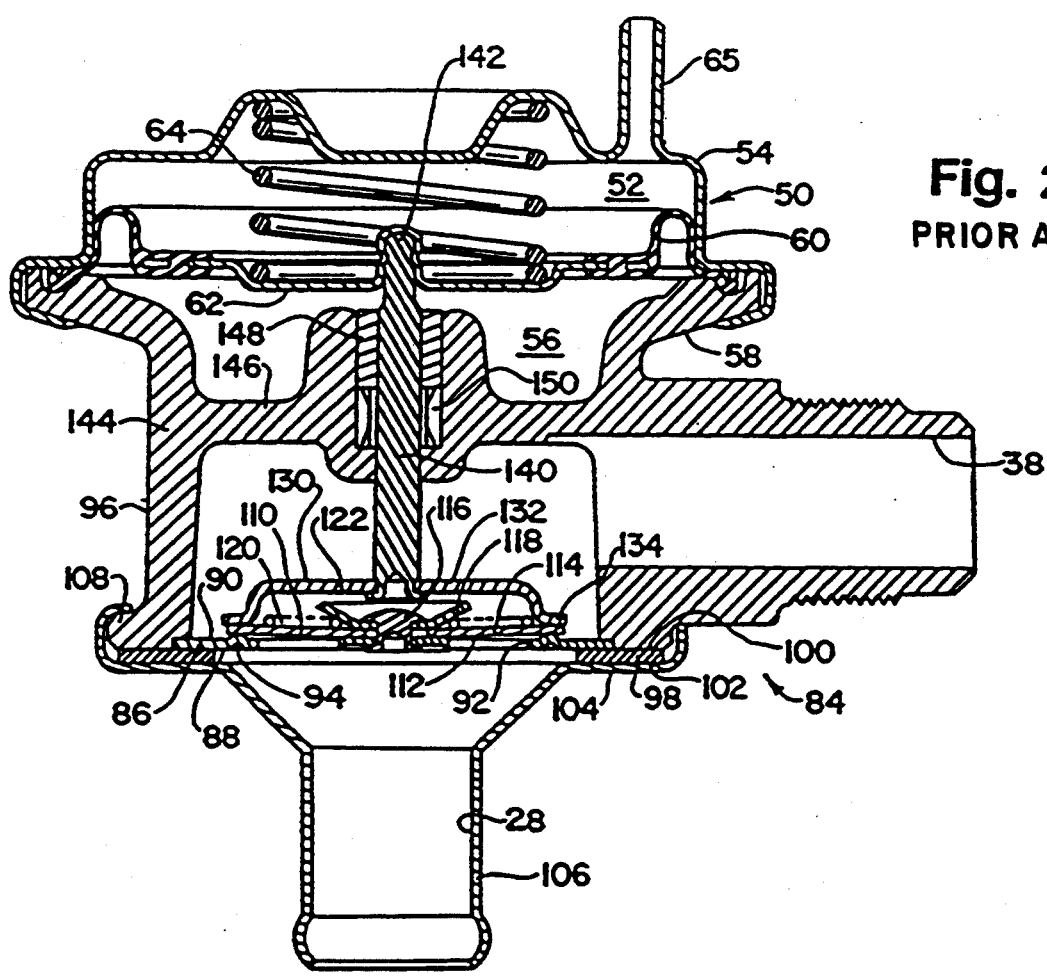
FIG. 2 is a section, taken in the plane of the intersecting axes of the inlet and outlet ports, of a composite supply and check valve that is prior art and disclosed in U.S. Pat. No. 5,203,872.
Figure 3:
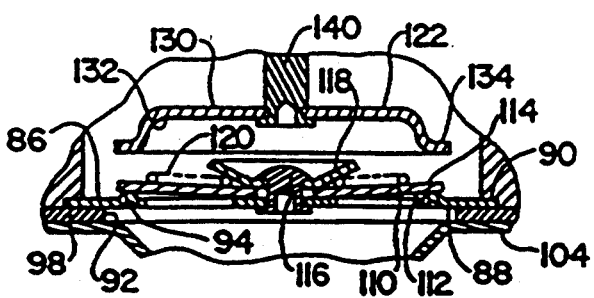
FIG. 3 is a detail view of the valve of FIG. 2, showing the valve disk retracted and the flap valve closed.
Figure 4:
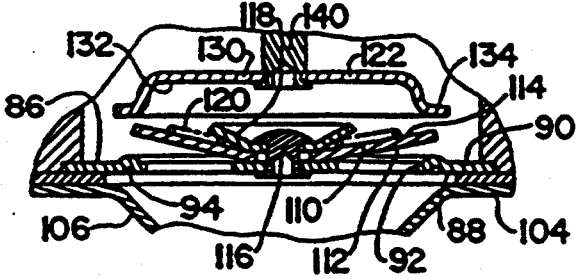
FIG. 4 is a view like FIG. 3, except that the flap valve is open.

Referring now particularly to FIGS. 2 through 4, the valve generally indicated at 84 further comprises a seat 86 having an upstream side 88 in fluid communication with the inlet port 28 and a downstream side 90 in fluid communication with the outlet port 38. (As used herein, "upstream" and "downstream" are in reference to a fluid, such as secondary air, flowing in through the inlet port 28 and out through the outlet port 38.) In this embodiment, the seat 86 is defined by a web having apertures such as 92 providing fluid communication between the upstream side 88 and the downstream side 90 when the valve 84 is fully open. The seat 86 has a rigid lip 94 on its downstream side 90 encircling all the apertures 92. In an alternate embodiment, the downstream side 90 of the seat 86 could function without a well-defined lip 94.

The web defining the seat 86 is inset in the body 96 and sealed by an annular gasket 98 having a downstream face 100 which overlaps the body 96 and the seat 86 and an upstream face 102 which is overlapped and captured by the flange 104 of the shell 106 defining the inlet port 28. This relationship of parts is maintained by rolling the outside portion of the flange 104 about the flange 108 of the body 96 to join them.

The first valve element, a flap 110, is annular, flexible, and has obverse first and second sides 112 and 114. The flap 110 is attached at its center by the button 116 to the seat 86, with the first side 112 of the flap 110 mounted adjacent to the downstream side 90 of the seat 86. The flap 110 is 5 nominally deformable axially between a open position (in which it is deflected downstream, as shown in FIG. 4) for allowing fluid flow through the seat 86 from the inlet port 28 to the outlet port 38 and an upstream or closed position, shown in FIGS. 2 and 3, in which the first side 112 is seated on the seat 86. When the flap 110 is closed, it covers the apertures such as 92 of the seat 86. When the flap 110 opens, responsive to a greater pressure in the inlet port 28 than in the outlet port 38, it uncovers the apertures such as 92 and thus permits a fluid to flow through the valve 84. The flap 110 is protected against buffeting and excessive deformation by a flap retaining cone 118, also secured by the center button 116 to the seat 86. The valve opens or closes automatically, and permits air from the pump 24 (as in FIG. 1) to flow into the joint 18 (FIG. 1) while preventing reverse flow of the exhaust if the pressure difference between the inlet and outlet ports is reversed.

While the check valve of FIG. 1 and that of FIGS. 2-4 are similar, they have some specific differences in this embodiment. The flap retaining cone 118 of FIGS. 2-4 is closer to the seat and has a smaller radius, relative to that of the flap 110, than the corresponding cone 82 of FIG. 1. This difference allows the disk 122, described further below, to be flatter and to have a relatively small diameter and still bridge the cone 118.

While the valve element 110 and seat 86 of the illustrated embodiment form a flap valve, other valve elements and corresponding seats are also contemplated. For example, the flap 110 could be replaced by a hinged or captive plate, a captive ball, an iris diaphragm, a sluice or gate, a butterfly element, a piston slidable in a ported sleeve, a disk pivoted on the seat and having apertures which can be rotated into or out of registration with corresponding apertures in the seat, or other elements which move relative to a seat or analogous member to partially or fully open and close an aperture.

Figure 5:
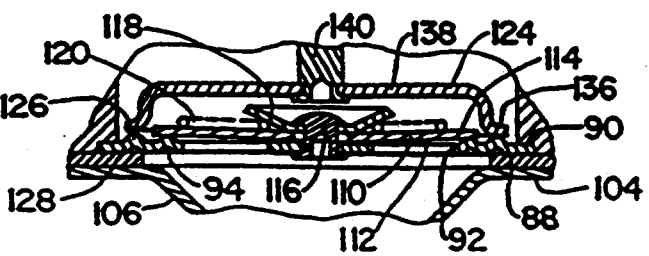
FIG. 5 is a detail view of a valve similar to that of FIG. 2, except that the valve disk bridges entirely over the flap valve and engages the seat directly.

The valve disk 122 of FIGS. 2-4 and the valve disk 124 of FIG. 5 are each embodiments of a second valve element or override means selectively operatively engageable with the seat and/or valve element for preventing flow through the apertures 92, notwithstanding any pressure difference experienced between the inlet port 28 and outlet port 38 in the environment in which the valve is designed to operate. In the embodiment of FIGS. 2-4, the disk 122 functions by maintaining the element defined by the flap 110 in its closed position and preventing the element 110 from shifting normally, as illustrated in FIG. 2. In the embodiment of FIG. 5 the disk 124 functions by bridging the element 110 entirely and directly seating against a concentric outer lip 126 of the seat 128. The disk 122 could also be modified by forming a depending flange about its periphery which covers the edge of the element 110, thus combining the functions of the disks 122 and 124.

Referring now to FIGS. 2-4, the valve disk 122 is a hat-shaped plate. The center or "crown" section 130 defines a recessed portion of the upstream face 132 of the valve disk 122 which faces the button 116 and the cone 118. The recess in the face 132 is provided so the disk 122 can bridge over the button 116 and cone 118 when the disk 122 is seated, as shown in FIG. 2. The outside or "brim" section 134 of the disk 122 is substantially registered with the lip 94 and an annular portion of the flap 110. The brim section 134 includes a bearing surface which clamps the flap 110 against the lip 94 when the disk is engaged, as in FIG. 2, and substantially clears the flap 110 when the disk is disengaged, as shown in FIGS. 3 and 4.

One particular advantage of this embodiment is that the flap 110 acts as a seal between the brim 134 and the lip 94, while the relatively rigid disk 122 reinforces and protects the second side 114 of the flap 110 against a corrosive, hot, or otherwise adverse environment.

In an alternate embodiment, the hat-shaped disk can be a cupped disk with no brim. In another alternate embodiment the cone 118 and button 116 can be omitted and the disk 122 can be substantially flat on its lower or upstream side. This latter embodiment is particularly feasible if the flap 110 is replaced by a captive, rigid disk element. In still another alternate embodiment the disk 122 can be replaced by a rod or other shiftable member which is not substantially coextensive with the element 110 or the apertures 92, but is capable of holding the element 110 or a comparable valve element (preferably a rigid element) against its seat. In yet another alternative, the crown 30 can be skeletonized. However, this expedient is less preferred in the environment of engine exhaust because a skeletonized crown 30 would reduce the protection from exhaust gases afforded the flap 110 by the disk 122.

Referring now to FIG. 5, the valve disk 124 of this embodiment is also hat-shaped, and bridges the button 116 and cone 118, but also bridges the flap 110 to directly engage the concentric lip 126 of the seat 128. For some applications, this construction may be advantageous because the disk 124 and outer lip 126 completely isolate the flap 110 from the outlet port 38 of the valve. In other cases, particularly if the outer lip 126 and the brim 136 of the disk 124 are each rigid and a tight seal between them is desired, the construction of FIG. 5 may be less preferred.

In an alternative to the embodiment of FIG. 5, the axial proportions of the lip 126 and of the crown 138 of the disk 124 can be varied. If desired, the disk 124 can be flat and the lip 126 can extend higher than the cone 118 to provide a similar effect.

Figure 6:
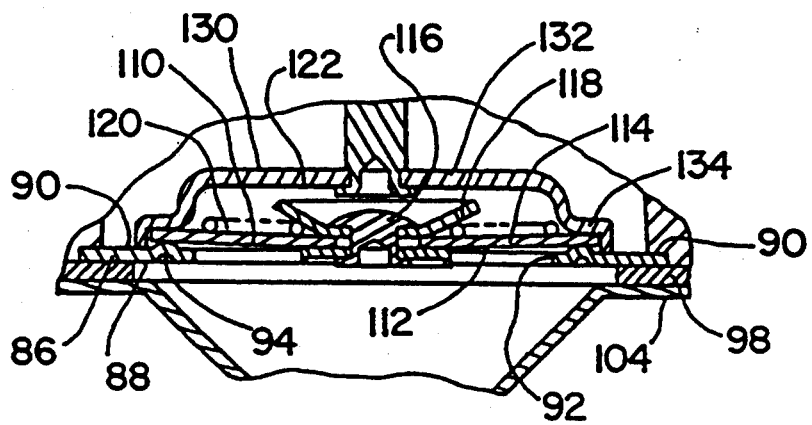
FIG. 6 is a detail view of a valve similar to that of FIG. 2, except the valve disk engages both the flap valve and the seat directly.

In the embodiment of FIG. 6, the disk 122 has a brim section 134 that includes both a bearing surface which clamps the flap 110 against the lip 94 and a surface that is coextensive with the downstream side 90 of the seat 86 when the disk is engaged as in FIG. 6.

In the embodiments of FIGS. 2–6, the disks 122 and 124 each are attached to the upstream end of a stem 140. Each stem 140 has a downstream end which here is operated by essentially the same diaphragm actuator 50 employed to operate the supply valve 30 of FIG. 1. The diaphragm actuator 50 of FIG. 2 has the same construction, and the same reference characters, as the actuator of FIG. 1. Alternate reciprocable actuators, such as a cam, a crank, or the like, are also contemplated herein.

Referring again to FIG. 2, some particular construction details of the illustrated embodiment are as follows. The valve body 96, lower housing 58, and associated parts shown in FIG. 1 are replaced by a one-piece molded and/or machined body 144 in FIG. 2. The body 144 has an integral web 146 supporting a bronze stem bearing 148 and an annular elastomeric seal 150 to guide and seal the stem 140.

Figure 7:
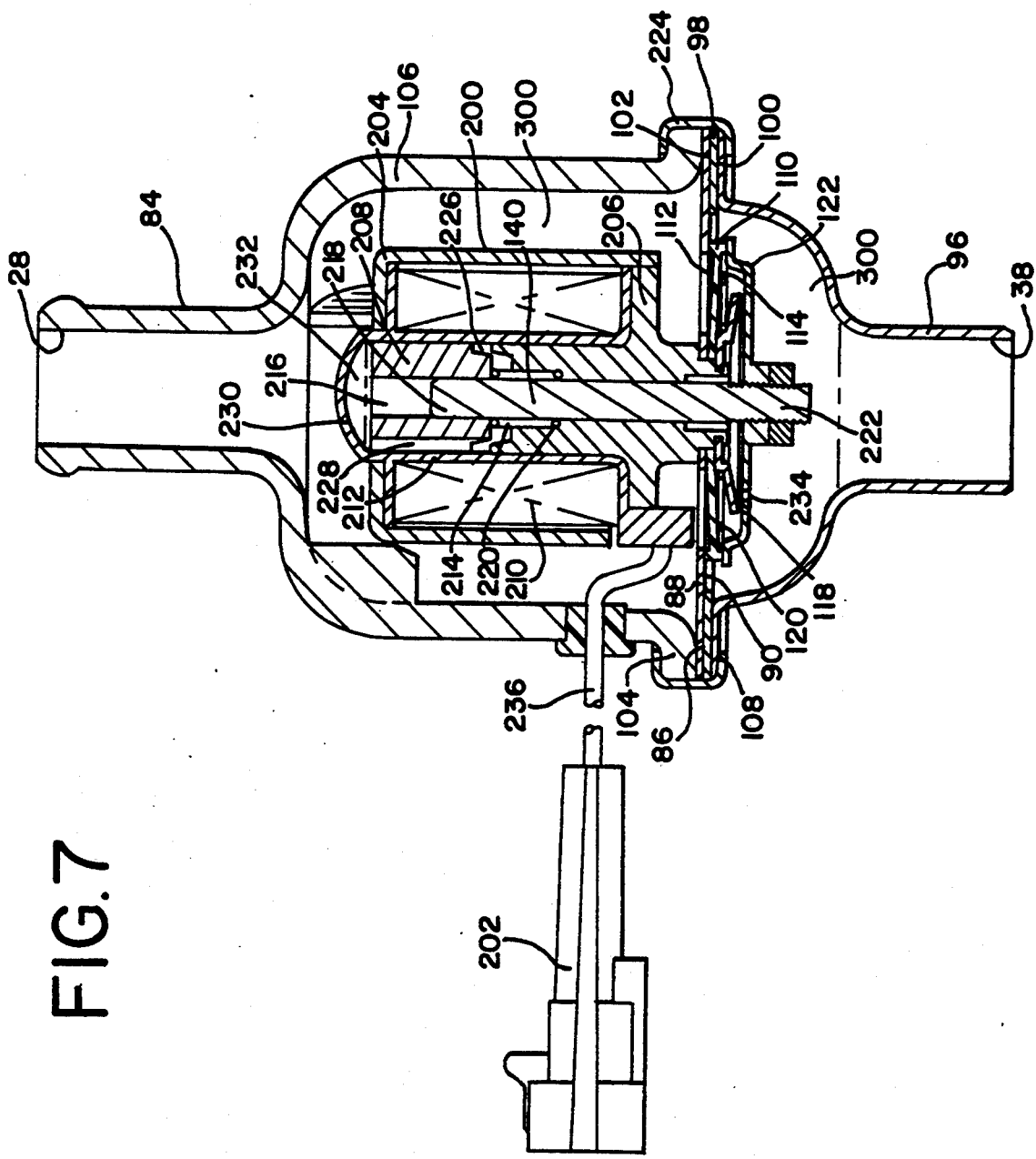
FIG. 7 is a sectional view, taken in the plane of the intersecting axes of the inlet and outlet ports, of a composite supply and check valve according to the present invention.

FIG. 7 is directed to the present invention and shows a composite valve 84 where the secondary air control valve includes an electromagnetic solenoid valve apparatus 200. Referring first to FIGS. 1, 2 and 7, the composite valve of FIG. 7 combines in an integral structure the component parts of the supply valve 30, the flap valve 36, the diaphragm actuator 50, the solenoid 70, the valve 68, control port 65 and vacuum line 66 shown in FIGS. 1 and 2. The valve 84 in FIG. 7 has an inlet port 28 adapted to receive the effluent of a pump 24, an outlet port 38 adapted to deliver air to an air injection joint 18, and an electrical connector 202 adapted to be connected to a computer 40.

An example of an electromagnetic solenoid valve suitable for use with the present invention is shown in U.S. Pat. No. 4,875,499, which is incorporated herein by reference. Referring now particularly to FIG. 7, the electromagnetic solenoid 200 further comprises an iron outer member or a can 204, a hollow cylindrical magnetic core pole piece or center member 206 having a center passage 214, a hollow cylindrical magnetic armature 208 having a center opening 216, an electrical winding 210 mounted about center member 206 and armature 208, and a coil spring 220. Spring 220 exerts a biasing force that separates pole piece 206 and armature 208 when electrical winding 210 is not energized. The separation between pole piece 206 and armature 208 defines an air gap 226.

The electrical winding 210 is encased on its upper, lower and inner diameter surfaces in a bobbin 212 generally of plastic material, which bobbin 212 surrounds and engages the pole piece 206 and the armature 208 along most of their axial dimensions. Wire 236 maintains electrical contact between electrical winding 210 and electrical connector 202. The electrical connector is connected to a suitable source of power, which can include direct current, alternating current, a pulse width modulated (PWM) circuit, an automobile on-board computer functioning as a signal source or the like.

Armature 208 is connected to valve disk or closure element 122 by stem 140. In particular, the upstream end 218 of stem 140 may pass through center passage 214 of the pole piece 206, and be attached to armature 208. In the preferred embodiment, the upstream end 218 of stem 140 is press fit into the center opening 216 of armature 208. The downstream end 222 of the stem 140 is connected to disk 122.

The retaining cone 118 is attached to pole piece 206. This relationship holds the valve element 110, conical spring 120, and seat 86 in place. In the preferred embodiment, retaining cone 118 is riveted to pole piece 206.

The remainder of the descriptions of the first valve element and second valve element of FIGS. 2–6 apply equally to the embodiment in FIG. 7 and will not be repeated here.

Referring now to FIG. 7, the web defining the seat 86 is inset in the body 96 and sealed by annular gasket 98 having a downstream face 100 which overlaps the body 96 and an upstream face 102 which is overlapped by the downstream side 90 of the seat 86. The upstream side 88 of the seat 86 is overlapped and captured by the flange 104 of the shell 106 defining the inlet port 28. This relationship of parts is maintained by clasp 224. The joinder of the body 96 and the shell 106 define a flow passage 300 between the inlet port 28 and the outlet port 38 of the composite valve 84.

In FIG. 7, the electromagnetic solenoid 200 is contained entirely within the flow passage 300 of the composite valve 84. The positioning of the electromagnetic solenoid 200 inside the flow passage 300 is maintained by guides 238 of the shell 106. Placing the electromagnetic solenoid 200 inside flow passage 300 is advantageous because the air flow through flow passage 300 helps to cool electromagnetic solenoid 200. Moreover, placing the electromagnetic solenoid inside the valve provides a unitary valve and electromagnetic actuator, which reduces the size and number of components.

The system 10 description provided above will not be repeated here and applies equally to the embodiment shown in FIG. 7 with the following modifications based on the operation of the electromagnetic solenoid 200 of the composite valve 84 in FIG. 7. Referring now to FIG. 1 and FIG. 7, when the engine 14 is started, the computer 40 starts the air pump 24 and signals the electrical connector 202 to energize the electrical winding 204. The electrical connecter 202 may supply either constant DC voltage or Pulse Width Modulated (PWM) voltage, hence making the electromagnetic solenoid 200 have variable position proportional to the signal duty cycle.

An electromagnetic flux is induced when the current is supplied from the electrical connector 202 to the electrical winding 204. The armature 208 is responsive to the electromagnetic flux. Thus, energization of electrical winding 204 causes the movement of the closure element 122 to allow fluid flow. In particular, when the flux is induced, the armature 208 is attracted toward pole piece 206. When totally energized, or 100% duty cycle, the armature 208 will be at the minimum distance from the pole piece 206, and the disk or closure element 122 will be at its maximum distance from the seat 86. The force (magnetic flux) required to move armature 208 is dependent on the bias of spring 220.

Referring now to FIGS. 7 and 1, when the disk 122 is disengaged from the seat 86, air enters the composite valve 84 at the inlet port 28. The air flows through flow passage 300 of the shell 106 to the valve 110. The force of the air on the first side 112 of the valve 110 causes the valve 110 to open against the bias of conical spring 120. The air then enters the flow passage 300 of the body 96 and exits the outlet port 38 of the composite valve 84 into the air injection joint 18. The air then passes through a run 20 of the exhaust pipe to a catalytic converter 22.

During the deenergized state, the bias of spring 220 will cause the armature 208 to be the maximum distance from pole piece 206. That distance defines the maximum air gap 226 between pole piece 206 and armature 208. When the armature 208 is at the maximum distance from pole piece 206, the disk 122 will rigidly close and seal flap 110. In that situation, the disk 122 acts as a sealing gasket, allowing no flow through the flap 110 in either direction.

During the operation of this embodiment, it is possible that there may be some undesired backflow of the exhaust fumes into the electromagnetic solenoid 200. Therefore, in the preferred embodiment, bobbin 212 has curvature 230 creating chamber 232. Chamber 232 acts as a reservoir in case any backflow should occur. Additionally, armature 208 is fluted and defines slot 228. Slot 228 prevents a vacuum from forming in air gap 226 in case some backflow should occur. Finally, disk 122 has a hole 234 which also helps to prevent a vacuum from forming in the case that backflow should occur.

Figure 8:
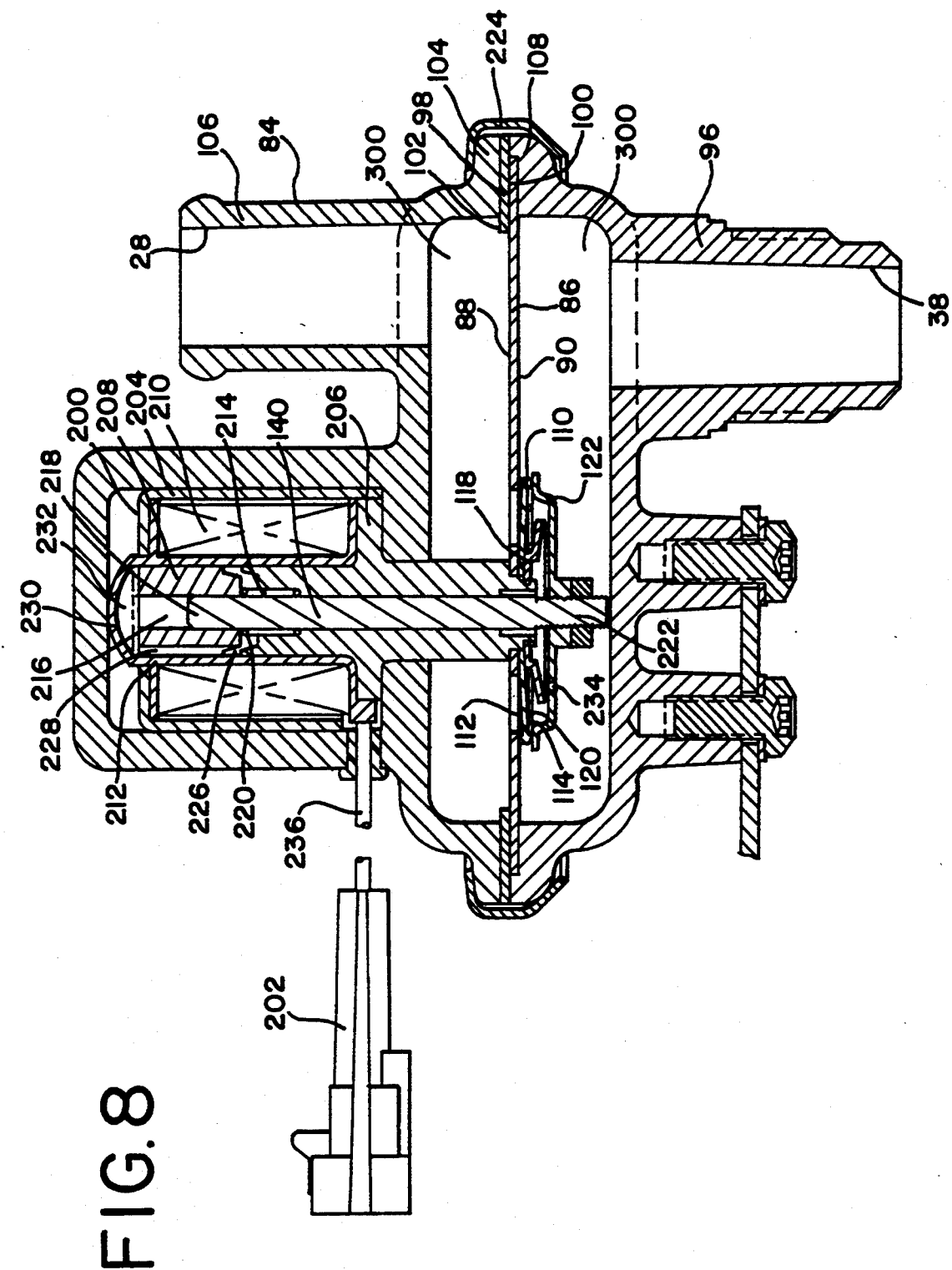
FIG. 8 is a sectional view, taken in the plane of the intersecting axes of the inlet and outlet ports, of an alternative embodiment of a composite supply and check valve according to the present invention.

FIG. 8 illustrates an alternate embodiment of the composite valve 84 with an electromagnetic solenoid 200. In this embodiment, the electromagnetic solenoid 200 is not contained entirely inside the composite valve 84. Referring to FIG. 8, placing the electromagnetic solenoid 200 outside the composite valve 84 creates an offset flow passage 300, but still allows the integral valve and solenoid assembly.

In FIG. 8, the web defining the seat 86 is inset in the body 96 and sealed by annular gasket 98 having a downstream face 100 which overlaps the body 96 and the upstream side 88 of the seat 86, and an upstream face 102 which is overlapped by the flange 104 of shell 106 defining the inlet port 28. The downstream side 90 of the seat 86 is overlapped and captured by the flange 108 of the body 96 defining the outlet port 28. This relationship of parts is maintained by clasp 224.

The remainder of the descriptions of the first valve element and second valve element of FIGS. 2–7 apply equally to the embodiment in FIG. 8 and will not be repeated here.

The remainder of the system 10 description provided for FIG. 7 above will not be repeated here and applies equally to the embodiment shown in FIG. 8.

Referring again to FIGS. 3, 4, 7 and 8, the present invention can also be used to more finely regulate the flow from the inlet port 28 to the outlet port 38 by allowing restricted opening of the flap 110. To do this, PWM voltage is supplied to electrical winding 210 allowing the disk 122 to vary its position between being fully seated (as in FIGS. 7 and 8) and fully disengaged (as in FIGS. 3 and 4). The disk 122 thus can be moved to any point between its positions in FIGS. 7 and 3. When it is at such an intermediate position the disk 122 can allow the flap 110 to open partially, thus reducing the amount of air flowing through the seat 86. This expedient can be used to gradually reduce the amount of air introduced into the exhaust of the engine 14, instead of abruptly cutting off the air flow.

Thus, a single secondary air control and check valve which does the work of the independent supply valve and check valve of the prior art has been shown and described. The valve can be inexpensive, durable, and reliable. A flexible flap and a rigid valve disk cooperate to provide a composite valve function. The flap valve can be overridden and at the same time protected against damage from the fluid contacting it.

The illustrated valve can alternately function as a check valve and as a positively closing valve. It can include a flap as a first valve element which also serves as a gasket for a superimposed poppet element.

What is claimed is:

1. A composite check valve comprising:
   an inlet port;
   an outlet port;
   a flow passage between said inlet port and said outlet port;
   a seat having an upstream side in fluid communication with said inlet port and a downstream side in fluid communication with said outlet port, said seat defining an aperture providing fluid communication between said upstream side and said downstream side;
   a first valve having a flap with obverse first and second sides, said flap being deformable between an open position for providing fluid communication between said inlet port and said outlet port, said first side of said flap being displaced from said seat in said open position, and a closed position for preventing such communication, said first side of said flap being substantially against said seat and substantially blocking flow through said aperture in said closed position;
   an electromagnetic solenoid having a portion being located in said flow passage, said solenoid having electrical winding defining a central magnetic flux axis and a plurality of magnetic segments, said magnetic segments including an armature and a pole piece adjacent said armature, said armature being physically translatable within a portion of said solenoid electrical winding along said flux axis relative to said pole piece;
   a translatable closure element attached to and moveable with said armature, said closure element being positioned between said flap of said first valve and said outlet port, translation of said closure element being independent of said deformability of said flap of said first valve, said closure element being selectively engageable with said flap of said first valve for maintaining said flap in said closed position and preventing said deformation of said flap; and
   energization of said electrical winding being effective to cause translation of said armature and said closure element.

2. The composite valve of claim 1 wherein said closure element bears against the second side of said flap to selectively maintain said flap in said closed position.

3. The composite valve of claim 2 wherein said closure element has first and second sides, said first side faces the second side of said flap and has a portion facing and substantially coextensive with said seat.

4. The composite valve of claim 2 wherein a portion of said electrical winding is encased in a bobbin, said armature being located within said bobbin.

5. The composite valve of claim 4 wherein said armature is generally cylindrical in shape and axially translatable along a cylindrical passage in the center of said winding, said pole piece having a cylindrical portion within said winding.

6. The composite valve of claim 5 wherein said closure element is connected to said armature by a cylindrical stem; said stem extending from said closure element through said pole piece.

7. The composite valve of claim 6 wherein said stem is axially translatable along said central flux axis.

8. The composite valve of claim 7 wherein said cylindrical stem extends through the center of said pole piece and the center of said armature.

9. The composite valve of claim 8 wherein said bobbin includes a curvature extending across said central flux axis, said curvature and said armature forming a fluid chamber therebetween.

10. The composite valve of claim 9 wherein said closure element has first and second sides, and an opening providing communication between said first and second sides of said closure element.

11. The composite valve of claim 10 wherein said armature includes a slot, said slot forming a fluid passage connected to said fluid chamber.

12. The composite valve of claim 11 wherein said solenoid includes a resilient coil spring interposed between said armature and said pole piece, said spring acting to urge said armature away from said pole piece.

13. The composite valve of claim 1 wherein said electromagnetic solenoid is enclosed entirely within said flow passage.

14. The composite valve of claim 1 further comprising a resilient spring and a retaining element on said downstream side of said seat, said spring interposed between said retaining element and said flap, said spring urging said flap away from said retaining element.

15. The composite valve of claim 14 wherein said pole piece includes a downstream end, said retaining element being attached to said downstream end of said pole piece, supporting said seat, said flap, and said spring in place.

* * * * *

UNITED STATES PATENT AND TRADEMARK OFFICE
CERTIFICATE OF CORRECTION

PATENT NO. : 5,421,366
DATED : June 6, 1995
INVENTOR(S) : Lee A. Naffziger et al.

It is certified that error appears in the above-indentified patent and that said Letters Patent is hereby corrected as shown below:

<u>On the Title Page</u>

In column 1, line 18 under "References Cited U.S. PATENT DOCUMENTS" delete "Taleagi" and substitute --Takagi--.

In column 1, line 19 under "References Cited U.S. PATENT DOCUMENTS" delete "4,193,212" and substitute --4,183,212--.

In column 2, line 6 under "References Cited U.S. PATENT DOCUMENTS" delete "Naffzigr" and substitute --Naffziger--.

Signed and Sealed this

Twentieth Day of August, 1996

Attest:

BRUCE LEHMAN

Attesting Officer     Commissioner of Patents and Trademarks